United States Patent [19]

Shoemaker et al.

[11] Patent Number: 5,732,730
[45] Date of Patent: Mar. 31, 1998

[54] COMBINED CHECK VALVE AND METERING VALVE ASSEMBLY

[75] Inventors: Robert D. Shoemaker, West Des Moines; David I. Tibbs, Urbandale, both of Iowa

[73] Assignee: Delavan Inc, West Des Moines, Iowa

[21] Appl. No.: 526,518

[22] Filed: Sep. 11, 1995

[51] Int. Cl.$^6$ .................................... F16K 11/02
[52] U.S. Cl. ........................ 137/118.06; 137/115.14
[58] Field of Search .................. 137/118.02, 118.06, 137/115.14

[56] References Cited

U.S. PATENT DOCUMENTS

| | | | |
|---|---|---|---|
| 2,070,411 | 2/1937 | Powers | 137/115.14 |
| 3,322,134 | 5/1967 | Enemark | 137/115.14 |
| 3,360,199 | 12/1967 | Sharpe | 137/118.06 X |
| 4,057,073 | 11/1977 | Adams | 137/118.06 |
| 5,058,618 | 10/1991 | Bacardit | 137/115.14 |

*Primary Examiner*—Stephen M. Hepperle
*Attorney, Agent, or Firm*—Cummings & Lockwood

[57] ABSTRACT

A pressure-actuated valve of the type used in the fuel systems of gas turbine engines and the like combines the functions of check valve and metering valve in a housing forming a single assembly. A movable valve actuator is slidably movable along a central axis within the housing. The actuator has two spaced-apart valve faces that cooperate with two spaced apart valve seats mounted to the housing. One of the valve-seat/valve-face combinations controls flow through a primary outlet port from the housing, and the second combination controls fluid flow through a separate, secondary outlet. The second valve combination includes telescopically mating inner and outer wall surfaces having a metering passage in the outer wall characterized by a transverse cross-section that varies from a minimum to a maximum at its opposite ends. As the inner and outlet wall surfaces move relative to each other, the exposed cross-section of the metering passage increases to permit increased flow through the valve. The second valve combination opens in sequence, subsequent to opening of the primary combination, as the actuator is displaced along its axis. Biasing springs having differing spring rates apply biasing force to the actuator along its path. Hydraulic pressure-receiving surfaces on the actuator are exposed to pressurized fluid flowing through the valve to generate hydraulic forces for moving the valve actuator against the biasing force of the springs.

8 Claims, 3 Drawing Sheets

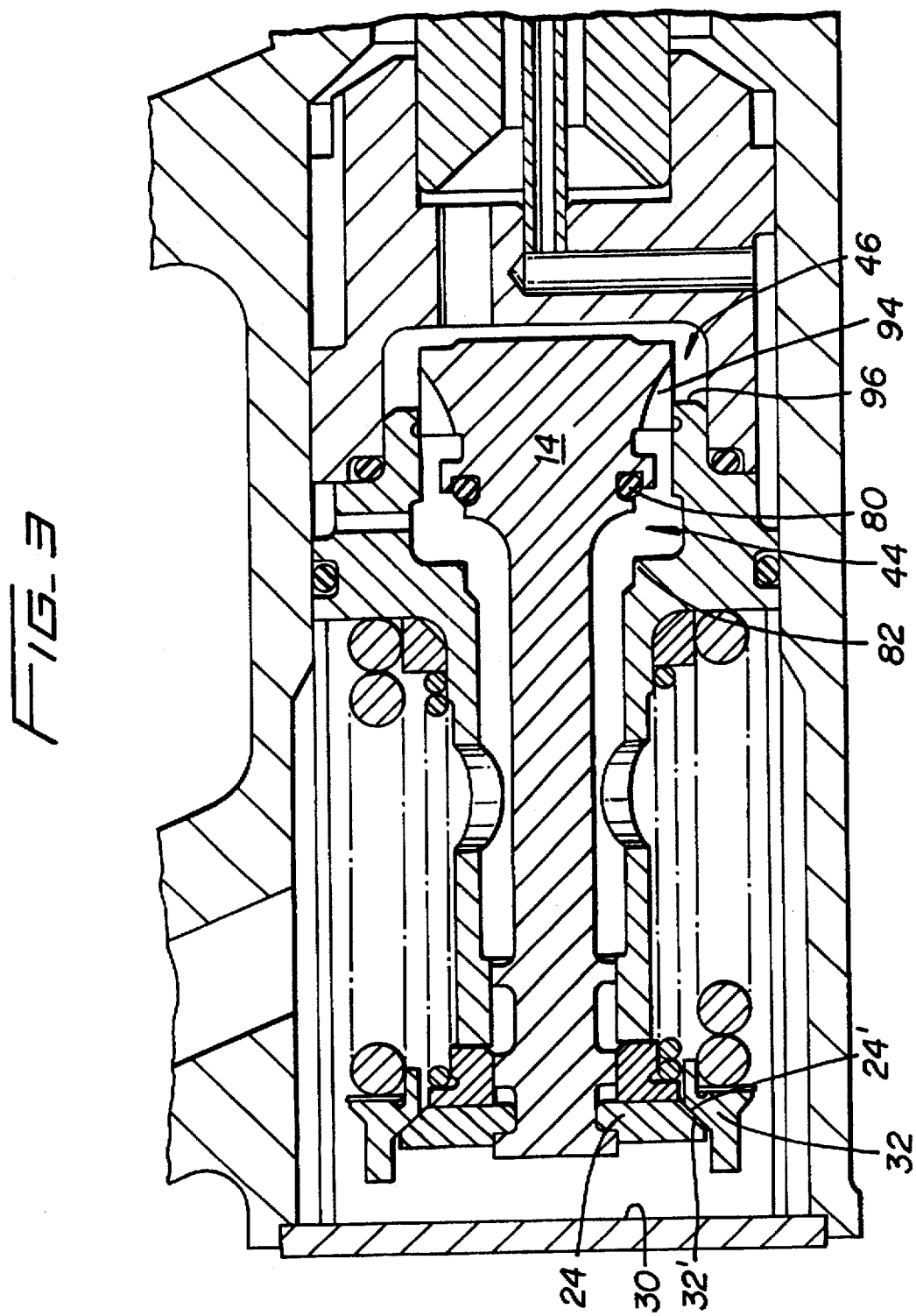

COMBINED CHECK VALVE AND METERING VALVE ASSEMBLY

BACKGROUND OF THE INVENTION

The invention relates generally to valve assemblies used in fuel systems of combustion engines and more specifically relates to a combined check valve/metering valve assembly for use in such fuel supply systems.

It is well known that in the fuel supply systems of combustion engines such as gas turbine engines, it is desirable to: (a) preclude flow of even small amounts of fuel from the fuel reservoir to the nozzles that deliver fuel to the engine combustion chambers, by a check valve function, when the engine is shut down; (b) open the check valve to provide a first fuel flow path between the reservoir and the engine when a relatively low pressure differential exists between the reservoir and the engine, as when the engine is operating at relatively low speed and light load, and (c) meter the amount of fuel supplied to the engine when the engine is operated under load, by opening a second, variable-rate flow path when the pressure differential exceeds a predetermined value. In the past, it has been customary for these two functions, namely check valve and metering valve, to be performed by two substantially independent valve assemblies. The use of two separate assemblies results in increased cost and weight, increased use of space and increased opportunities for malfunctions to occur among the multiple parts that are required.

Accordingly, it is an object of this invention to provide an improved valve construction in which the functions of check valve and metering valve are combined into a single multi-port valve assembly. It is a further object of this invention to provide a combined, multi-port valve assembly that is more compact, requires fewer parts and is lighter in weight than the structures disclosed in the prior art that rely on conventional combination of separate metering valves and check valves disclosed in the prior art.

BRIEF SUMMARY OF THE INVENTION

A feature of this invention is the use of a single movable valve member that is subjected to two different resilient forces such that the valve member is displaced against a first biasing force to open a first flow path, and is further displaced against a second biasing force to open a second, variable-rate fuel flow path. Displacement of the valve member is achieved by hydraulic force derived from pressurized fuel acting on properly sized and positioned pressure surfaces on the valve member.

These and other and further objects, features and advantages of this invention will be made apparent to those having skill in this art by the following specification and the accompanying drawings, in which:

BRIEF DESCRIPTION OF THE DRAWINGS

FIG. 3 is a similar view of the same valve shown with its first and second outlet ports in their open positions.

DETAILED DESCRIPTION OF THE INVENTION

Figure 1:
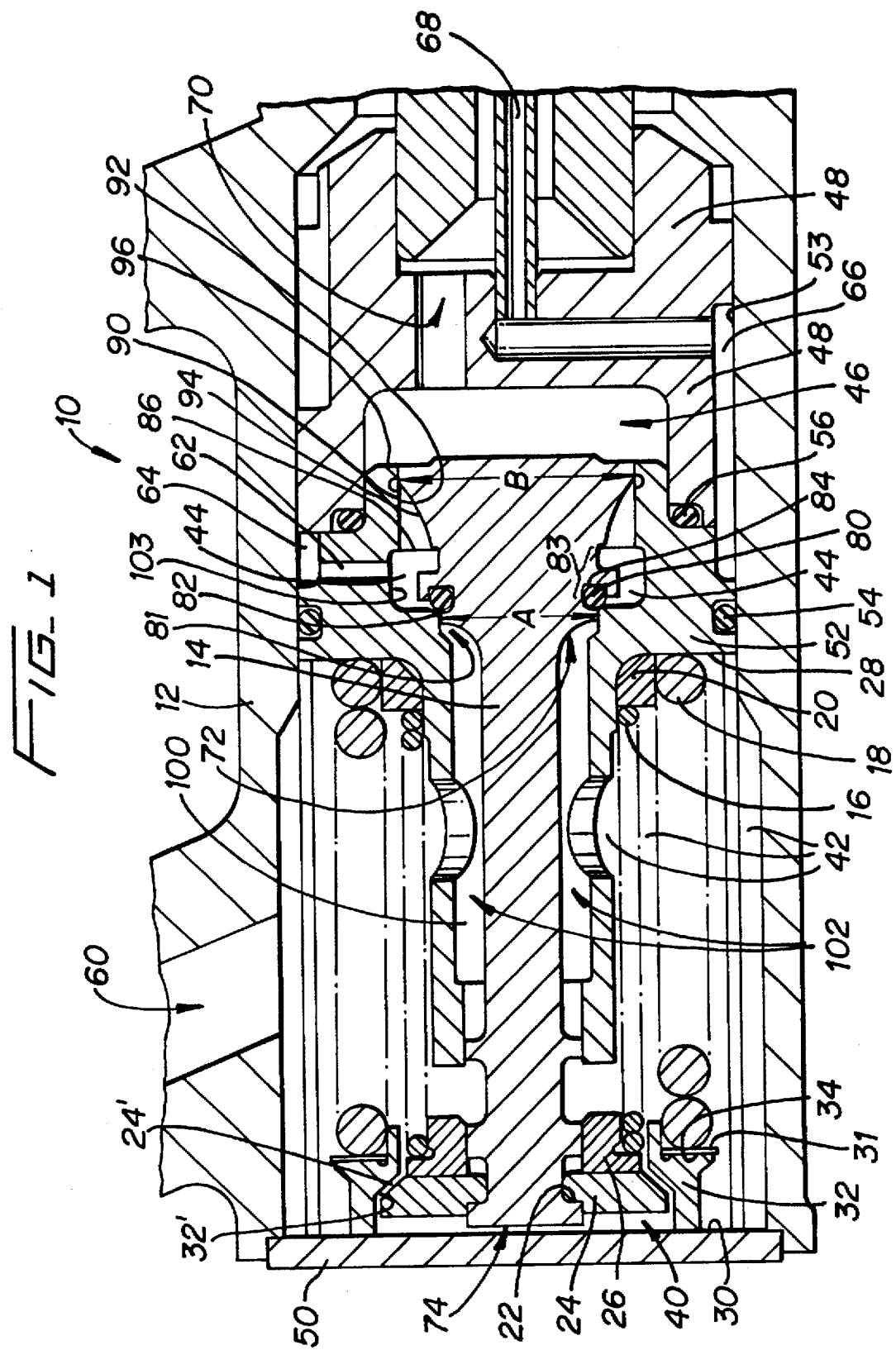
FIG. 1 is a longitudinal cross-section of a valve assembly in accordance with this invention with all outlet ports shown in a closed position.

Referring to the drawings more particularly, the valve assembly 10 of this invention may be seen to comprise a housing 12 having a movable valve member 14 slidably mounted within the housing for displacement against the biasing forces exerted by biasing compression springs 16 and 18.

Biasing spring 16 acts on valve member 14 at all times to bias the valve member into its sealed, or fully closed position, toward the left, as shown in FIG. 1. Spring 16 is captured between a first stop shoulder 20 that is fixed in position relative to housing 12 and an abutment shoulder 22 on valve member 14. For simplicity of construction, as will be apparent to those having skill in this art, a pair of ring collar members 24, 26 are interposed between spring 16 and shoulder 22, to transmit biasing forces to member 14 relative to housing 12, although various other coupling arrangements of known or obvious design may be used.

Biasing spring member 18, as shown in FIG. 1 is captured between a second stop shoulder 28 that is fixed in position relative to housing 12, and an opposed bearing surface 31 on a spacer collar 32 that is interposed between one end 34 of spring 18 and an anchor shoulder 30 on housing 12. The spacer collar 32 is mounted so that it may be longitudinally displaced away from shoulder 30 within housing 12, as explained below, to compress spring 18 against stop shoulder 28.

When valve assembly 10 is in the fully closed position as shown in FIG. 1, a receiving abutment surface 32' on collar 32 is positioned in opposed, axially spaced-apart relationship to mating abutment surface 24' on collar 24. After movable valve member 14 has been displaced a finite axial distance to the right against the biasing force of spring 16, under the influence of displacement forces that will be explained below, abutment surfaces 24' and 32' engage each other in abutting relationship such that further axial displacement (to the right) of movable member 14 will further compress springs 16 and 18 simultaneously.

It is well known that compression springs such as 16, 18 may be designed to resist compression with any desired and predetermined axial force.

For the purposes of this invention, the axial forces of biasing springs 16 and 18 are selected so that an axial force in the range of, for example, 1 to 50 pounds acting on movable member 14 will overcome the biasing force of spring 16 and allow member 14 to move to the right until surfaces 24', 32' meet in abutting relationship. Thereafter, the force acting on member 14 may be increased without further displacement until a total axial force in the range of, for example, 50 to 100 pounds, overcomes the biasing force of both springs 16 and 18 and continues to displace member 14 toward the right.

The specific forces acting on member 14 to overcome the biasing forces of springs 16 and 18 are derived from the hydraulic pressure of the pressurized fluid, for example aircraft engine fuel, that is controlled by the valve 10. Pressurized fluid flows through the valve and is contained within housing 12, as follows: As seen in FIG. 1, housing 12 includes a generally cylindrical central opening 40 that is divided into an inlet chamber area 42, a first or primary outlet chamber 44 and a secondary outlet chamber 46. A first end cap 48 at one end of central opening 40 cooperates with housing 12 to close that end of the opening. A second end cap 50 at the axially opposite end of opening 40 similarly cooperates with housing 12 to close the opposite end of the opening so as to form an internal enclosure within housing 12. Within the enclosure, an insert sleeve 52 cooperates with end caps 48 and 50, the inner wall surface 53 of opening 40, and with movable member 14, to divide opening 40 into chambers 42, 44 and 46.

Insert sleeve 52 is fitted with a circumferential fluid seal such as O-ring 54 to seal between sleeve 52 and the inner wall surface 53 of housing 12, in any well-known manner. Another circumferential fluid seal such as O-ring 56 similarly provides a seal between abutting portions of end cap 46 and insert sleeve 52, to prevent unintended escape of fluid from passage 66 into chamber 46.

Insert sleeve 52 further includes a substantially cylindrical central bore 100 that is configured to receive movable valve member 14 in telescopic sliding relationship. Bore 100 includes a first given diameter portion 102, an enlarged diameter portion 103 defining primary outlet chamber 44 and an adjacent cylindrical inner surface end portion 92, that is generally larger than the given diameter of portion 102, for receiving metering surface 90 of valve member 14. As valve member 14 slides telescopically within bore 100, valve face O-ring 80 engages and disengages from valve seat 82, which surrounds and defines a valve passage 81 through sleeve 52, while metering surface 90 moves telescopically within cylindrical portion 92 until curved passages 94 are exposed into, or are shut off from fluid flow access to, outlet chamber 46.

To provide for the desired flow of fluid into and out of the valve, housing 12 is provided with an inlet port 60 to permit fluid flow into inlet chamber 42, while outlet chamber 44 is provided with a primary outlet passage or pathway 62, 64, 66, 68, and outlet chamber 46 is provided with a secondary outlet passage 70. In use, for example in the fuel system of a gas turbine aircraft engine, inlet 60 may be coupled to a fuel supply reservoir (not shown) carried on the aircraft, while passages 70, and 62, 64, 66, 68, may be coupled to secondary and primary fuel injectors respectively (not shown) associated with the combustion chambers of the aircraft engine (not shown). In such a fuel system, a fuel pump (not shown) usually will be included in the system to assure the supply of pressurized fuel to the inlet port 60 of valve assembly 10.

Movable valve member 14 responds to pressurized fluid within housing 12 and to differences in fluid pressure between pressure at inlet 60 and pressure at outlets 68 and 70, as follows: pressurized fluid admitted through inlet port 60 into inlet chamber 42 exerts hydraulic pressure on pressure-receiving surfaces 72, 74 of movable member 14. When the cross-section shape of member 14 is substantially circular, the effective surface area of surfaces 72, 74 is equal to the area of a circle having diameter A (as shown in FIG. 1). When the total hydraulic force acting on surfaces 72, 74 exceeds the initial spring rate force of spring 16, movable member 14 will be displaced toward the right, to permit fluid from chamber 42 to flow into chamber 44.

Outlet chamber 44 is completely closed off from inlet chamber 42, by the engagement of circumferential valve face O-ring 80 with valve seat 82. The valve seat may be formed in any well-known manner on insert sleeve 52 surrounding valve passage 81. O-ring 80 is captured to valve member 14 in a circumferential groove 84, also in a known manner. When pressurized fluid is admitted to chamber 44 it is permitted to flow out of valve assembly 10 through primary outlet pathway 62, 64, 66, 68 for utilization by an engine or other destination device in accordance with known art. The presence of pressurized fluid in chamber 44 adds an additional hydraulic force acting to move member 14 toward the right; the added hydraulic force derives from hydraulic pressure acting on the added surface are represented by pressure-receiving surface 86 which is equal to the difference between the surface within diameter B and the surface within diameter A. The spring rate of metering biasing spring 18 is selected so that the first fluid pressure that is sufficient to overcome the check valve biasing spring 16 and to unseat valve face O-ring 80 from valve seat 82 is not sufficient to overcome the biasing force of metering bias spring 18, even when that first fluid pressure is allowed to act on the increased area of pressure-receiving surface 86.

The second fluid outlet path within the valve assembly of this invention now can be seen in FIG. 1 to include the outermost cylindrical surface 90 of member 14, the mating inner cylindrical surface 92 formed in insert 52 and the longitudinal curved passages 94 that extend part-way through the axial length of outer cylindrical surface 90. A plurality of such passages may be radially spaced around the periphery of cylindrical surface 90 but, only one such passage may be used, if desired.

Telescopic movement of cylindrical portion 90 within cylinder portion 92 allows curved passages 94 to be moved into and out of confinement within cylinder portion 92. When the passages 94 are fully confined, flow of fluid out of chamber 46 is blocked. As cylindrical portion 90 moves progressively to the right under hydraulic force acting against the resistance of springs 16 and 18, an increasing axial length of each passage 94 extends beyond the end face 96 of insert 52. Passage 94 is configured to permit the rate of fluid flowing through it to increase in proportion to the axial length of the passage that is exposed beyond end face 96. Accordingly, in a manner that will be recognized readily by those skilled in this art, valve assembly 10 will meter the amount of fluid flowing out to a utilization device through secondary outlet 70 in accordance with the pressure differential between inlet port 60 and outlet port 70 by causing the flow rate to increase or decrease in direct relation to increases or decreases in the pressure differential. It will be understood that this occurs because an increasing pressure differential will result in an increasing net hydraulic force acting on movable member 14 to press springs 16, 18, which will displace member 14 progressively toward the right to expose an increasing axial length of passage 94 beyond end face 96 of sleeve 52. Because valve portion 80, 82 in effect opens immediately as valve member 14 moves from its at-rest position, while passages 94 are not opened into chamber 46 until valve member 14 has been displaced through a finite axial displacement, it is possible for passages 94 to remain within the axial length of cylinder 92, so that valve 80, 82 can be opened, to permit fluid flow from inlet 60 to outlet path 62, 64, 66, 68, while flow through outlet chamber 46 to outlet path 70 remains blocked.

When the fluid pressure of fluid entering at inlet 60 is increased sufficiently to overcome the biasing force of metering spring 18 as previously explained, further displacement of valve member 14 toward the right is shown in the drawings will permit curved passage 94 to pass out of the confines of cylinder 92 and into fluid communication with outlet chamber 46. The axial extent to which passage 94 projects beyond the end surface 96 of insert 52 will determine the rate at which fluid in chamber 46 will flow through outlet path 70. In turn, the axial extent that passage 94 extends beyond the end 96 of cylinder 92 will be determined by the spring forces of metering springs 16 and 18, the effective total area of pressure-receiving surfaces 72, 74 and 86, and the overall difference between the fluid pressure at inlet port 60 and at outlet chamber 46. Positioning of one or more paths 94 relative to cylinder 92 can be understood to provide the metering fuel-flow function that is a feature of this invention.

Figure 2:
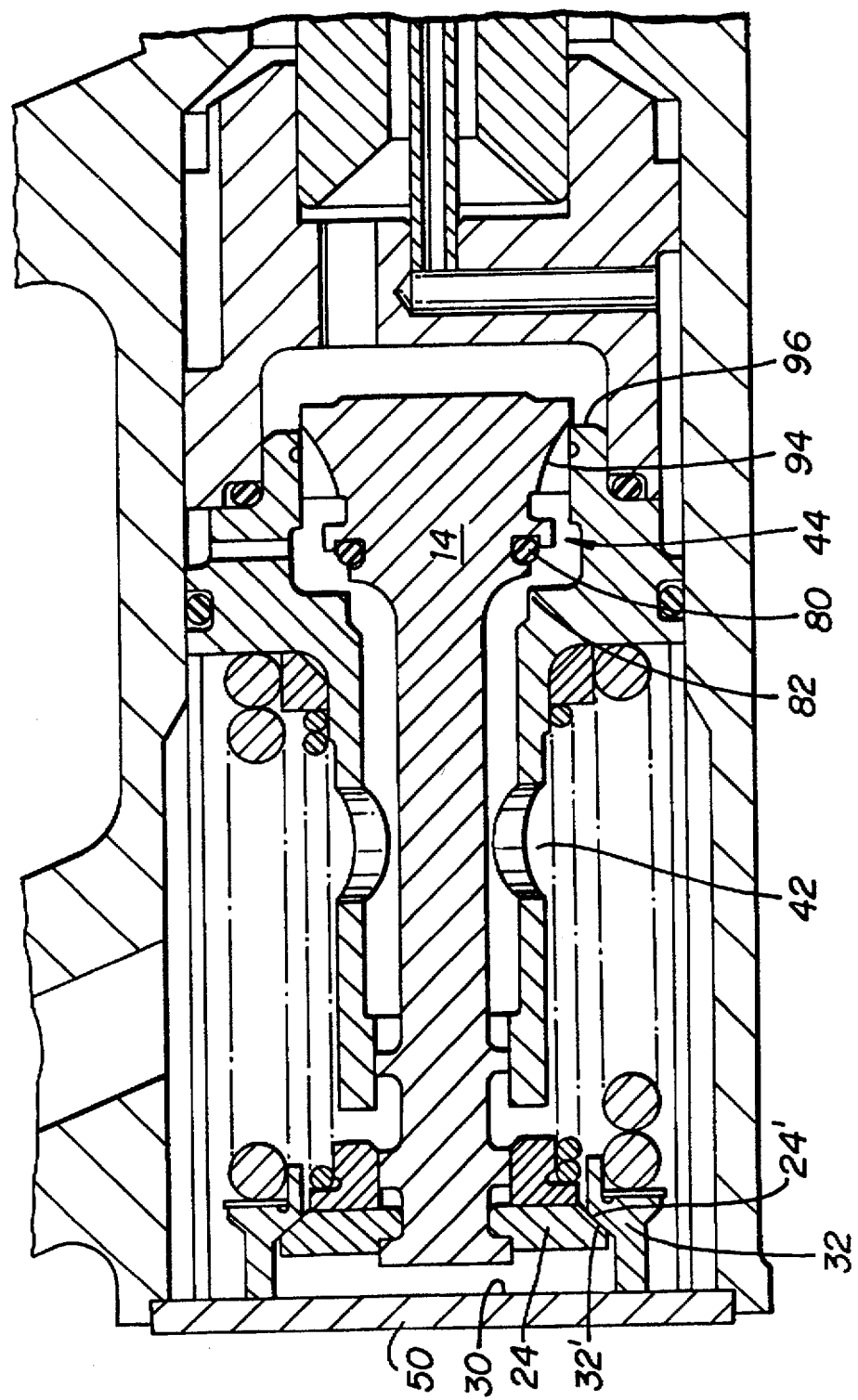
FIG. 2 is a longitudinal cross section of the valve assembly of FIG. 1, shown with a first outlet port in its open position.

Referring now collectively to FIGS. 1 through 3, it can be seen, in FIG. 1, which represents the fully-closed position of valve assembly 10, that valve face 80 is seated on valve seat 82 so that inlet chamber 42 is fully isolated from outlet chamber 44 (as well as from outlet chamber 46), while passages 94 are fully confined within cylindrical surface 92 of insert 52 such that fluid flow between outlet chambers 44 and 46 is blocked, similarly. In this fully closed position, metering spring 18 biases spacer collar 32 against bearing surface 30 of end cap 50. In this position abutment surface 32' is axially spaced from mating abutment surface 24' so that metering spring 18 is fully isolated from any force-applying relationship with movable member 14.

In FIG. 2 it can be seen that movable member 14 has moved to the right, unseating valve face O-ring 80 from valve seat 82 to allow fluid flow from inlet chamber 42 into outlet chamber 44, while passages 94 remain confined within cylindrical surface 92, and by precluding fluid flow into outlet chamber 46. In this position mating abutment surface 24' is firmly engaged with receiving abutment surface 32' so that the initial biasing force of biasing spring 18 is transmitted directly to movable member 14 through ring collar 24 and abutment shoulder 22. In general, spacer collar 32 will remain engaged against anchor shoulder 30 in this position.

In FIG. 3, displacement of movable member 14 has been displaced further to the right under the influence of hydraulic forces generated by pressurized fluid admitted into inlet chamber 42; in this position, valve face O-ring 80 remains disengaged from valve seat 82, thus permitting fluid flow from inlet chamber 42 to primary outlet chamber 44; at the same time, secondary outlet passages 94 extend substantially into outlet chamber 46 while their bases remain in fluid communication with outlet chamber 44, so as to primary outlet chamber 44 into secondary outlet chamber 46 and on through outlet passage 62, 64, 66, 68.

The continuous progressive movement of valve member 14 from its first or fully-closed position through its second, or check-valve-open position and then through its third, or fully-open position thus achieves metering of fluid flow through secondary outlet passage 70, as the axial extent of passage 94 beyond the end 96 of insert 52 varies with the balance of the spring forces and pressure forces acting on valve member 14. The third position of valve member 14 may be considered to be the portion of its travel from the point at which passage 94 first opens beyond end surface 96 to permit fluid flow into secondary outlet chamber 46, until springs 16 and/or 18 have been fully compressed and no further displacement of member 14 toward the right, is possible. It will be understood that any other suitable stop means, other than full compression of springs 16, 18, may be used to limit the displacement of member 14.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such and equivalent structures as is permitted under the law.

We claim:

1. A unified check valve and metering valve assembly, comprising:

a housing having an internal enclosure for pressurized fluid;

a movable valve member mounted within said enclosure for movement relative to said housing from a first position to a second position and from said second position into a third position;

divider means cooperating with a first portion of said movable valve member to divide said enclosure into a fluid inlet chamber and a fluid outlet chamber;

said divider means further cooperating with a second portion of said valve member to divide said fluid outlet chamber into a primary outlet subchamber and a secondary outlet subchamber;

a first valve passage through said divider means for permitting fluid flow from said inlet chamber to said primary outlet subchamber;

a second valve passage through said divider means for permitting fluid flow from said primary outlet subchamber to said secondary outlet subchamber;

an inlet port in said housing for allowing fluid to flow into said inlet chamber;

a primary outlet port in said housing allowing fluid to flow out of said housing from said primary outlet subchamber;

a secondary outlet port in said housing allowing fluid to flow out of said housing from said secondary outlet subchamber;

said valve member extending through said first and second valve passages and having first and second valve face portions thereon for engaging said first and second valve passages respectively, in fluid-flow obstructing relationship when said valve member is disposed in said first position;

said valve member being configured such that in said second position said first valve face is displaced from fluid-flow obstructing relationship with said first valve passage and said second valve face remains in fluid-flow obstructing relationship with said second valve passage and in said third position said first valve face is displaced from fluid-flow obstructing relationship with said first valve passage and said second valve face is displaced from fluid-flow obstructing relationship with said second valve passage;

resilient biasing means applying an initial biasing force of given value to resist displacement of said movable valve member from said first position toward said second position, and further applying an increased biasing force of greater than said given value to resist displacement of said movable valve member from said second position toward said third position;

said valve member having a first fluid-pressure receiving surface area thereon exposed to fluid in said inlet chamber for receiving fluid pressure force to displace said valve member from said first position toward said second position, and having a second fluid-pressure receiving surface area thereon exposed to fluid in said primary outlet subchamber for receiving fluid pressure force to displace said valve member from said second position toward said third position;

wherein said second valve passage and said second valve seat are cooperatively configured to permit an increasing volume of fluid to flow through said second valve passage as said valve member moves progressively into said third position under the influence of fluid pressure.

2. The valve assembly of claim 1, wherein:

said resilient biasing means comprises a first compression spring and a second compression spring, and said first compression spring provides said initial biasing force of given value and said second compression spring adds additional biasing force to provide said increased biasing force of greater than said given value.

3. The valve assembly of claim 2, wherein:

said compression springs are helical compression springs arranged in concentric relationship.

4. The valve assembly of claim 1, wherein:

said movable valve member is an elongate structure having a central axis along which said member is movable within said housing, and said first and second valve face portions are substantially circular portions extending radially outward from said central axis and axially spaced apart along said axis.

5. The valve assembly of claim 1, wherein:

said enclosure within said housing is defined in part by a substantially cylindrical inner wall surface of said housing, and said divider means comprises a substantially cylindrical insert sleeve within said enclosure having an outer wall surface that is positioned in concentric and closely abutting relationship with said inner wall surface.

6. The valve assembly of claim 4, wherein:

said first and second valve passages are circular openings in said divider means arranged in substantially coaxial alignment with each other and with the central axis of said valve member, such that said valve member extends axially through each of said first and second valve passages and one end of said valve member is exposed to said secondary outlet subchamber and the opposite end of said valve member is exposed to said inlet chamber.

7. The valve assembly of claim 4, wherein:

said second resilient biasing spring has a substantially axially oriented abutment shoulder thereon and said valve member has a substantially axially oriented mating shoulder thereon for engaging said abutment shoulder to transmit biasing force from said second resilient biasing spring to said valve member in an axial direction, said abutment shoulder and said mating shoulder being axially spaced apart from each other along the axis of said valve member when said valve member is in its said first position.

8. The valve assembly of claim 5, wherein:

said second valve face and said second valve passage together comprise an outer cylindrical wall surface portion on said valve member and a mating cylindrical inner wall surface in said insert sleeve proximate one end thereof, said inner and outer wall surface portions being positioned in telescopic mating relationship with each other, and said outer wall surface portion having formed therein at least one axially extending metering passage characterized by a radially extending cross-sectional area that varies from a maximum at one end thereof that is exposed to said primary outlet subchamber to a minimum at the opposite end thereof that is proximate to said secondary outlet subchamber, said metering passage terminating short of the axial end of said outer wall surface portion that is proximate to said secondary outlet subchamber such that as said valve member moves into said third position said outer wall surface portion must move through a finite axial distance relative to said inner wall surface portion before said metering passage is exposed beyond the proximate axial end of said insert sleeve.

\* \* \* \* \*